(12) United States Patent
Kamiya

(10) Patent No.: US 11,668,309 B2
(45) Date of Patent: Jun. 6, 2023

(54) VACUUM COMPONENT AND EVACUATION METHOD USING THE SAME

(71) Applicant: JAPAN ATOMIC ENERGY AGENCY, Ibaraki (JP)

(72) Inventor: Junichiro Kamiya, Ibaraki (JP)

(73) Assignee: JAPAN ATOMIC ENERGY AGENCY, Ibaraki (JP)

( * ) Notice: Subject to any disclaimer, the term of this patent is extended or adjusted under 35 U.S.C. 154(b) by 0 days.

(21) Appl. No.: 17/387,756

(22) Filed: Jul. 28, 2021

(65) Prior Publication Data

US 2022/0034327 A1 Feb. 3, 2022

(30) Foreign Application Priority Data

Jul. 31, 2020 (JP) .............................. JP2020-130266

(51) Int. Cl.
  *F04D 19/04* (2006.01)
  *F04B 37/04* (2006.01)
  (Continued)

(52) U.S. Cl.
  CPC ............ *F04D 19/042* (2013.01); *F04B 37/02* (2013.01); *F04B 37/04* (2013.01); *F04B 37/14* (2013.01)

(58) Field of Classification Search
  CPC .................................. F04B 37/02; F04B 37/04
  (Continued)

(56) References Cited

U.S. PATENT DOCUMENTS 5,685,963 A * 11/1997 Lorimer ................ C23C 14/564
  118/724
5,772,404 A * 6/1998 Carella ................... F04B 37/02
  417/313

(Continued)

FOREIGN PATENT DOCUMENTS

DE    102016105222 A1    5/2016
EP        3163641 A1    5/2017
(Continued)

OTHER PUBLICATIONS

European Patent Office. Extended European Search Report of foreign counterpart, dated Nov. 15, 2021.

(Continued)

*Primary Examiner* — Kenneth J Hansen
*Assistant Examiner* — Benjamin Doyle
(74) *Attorney, Agent, or Firm* — Hawaii Patent Services; Nathaniel K. Fedde

(57) ABSTRACT

Provided is a vacuum component capable of evacuation by a getting effect, which has a large maximum number of captured molecules and a long working life. It is provided, in an area around its central axis, with a hollow cylindrical electrode 20 having an electrode surface 20A that is sufficiently smaller than an inner surface 10A of the vacuum container 10, along the central axis. In the vacuum container 10, it is possible to realize any one of states among a first state of generating DC discharge by introducing Ar into the inside and setting the electrode surface 20A at a positive potential, a second state of setting the electrode surface 20A at a ground potential without introducing Ar, and a third state of generating DC discharge by introducing Ar into the inside and setting the electrode surface 20A at a negative potential. Evacuation by the vacuum component 1 is performed in the second state. Further, evacuation by the vacuum component 1 is performed also by realizing a state of performing a (Continued)

heating process at 400° C. or below without using the electrode.

7 Claims, 14 Drawing Sheets

(51) Int. Cl.
*F04B 37/02* (2006.01)
*F04B 37/14* (2006.01)

(58) Field of Classification Search
USPC .......................................................... 417/48
See application file for complete search history.

(56) References Cited

U.S. PATENT DOCUMENTS

| | | | | |
|---|---|---|---|---|
| 5,855,118 | A * | 1/1999 | Lorimer | .................. F04B 37/02 62/55.5 |
| 7,326,097 | B2 * | 2/2008 | Nomura | .................. H01J 9/027 445/6 |
| 2011/0089927 | A1 | 4/2011 | Yamazaki et al. | |
| 2018/0019096 | A1 * | 1/2018 | Ichimura | .................. H01J 37/16 |
| 2020/0149519 | A1 * | 5/2020 | Mase | ...................... C23C 14/26 |

FOREIGN PATENT DOCUMENTS

| | | |
|---|---|---|
| EP | 3546748 A1 | 10/2019 |
| GB | 2576968 A | 3/2020 |
| KR | 1020160047818 A | 5/2016 |
| WO | 2018/097325 A1 | 5/2018 |

OTHER PUBLICATIONS

C. Benvenuti, J. M. Cazeneuve, P. Chiggiato, F. Cicoira, A. Escudeiro Santana, V. Johanek, V. Ruzinov, J. Fraxedas, "A novel route to extreme vacua: The non-evaporable getter thin film coatings", Vacuum, vol. 53 p. 219(1999).

C. Benvenuti, P. Chiggiato, F. Cicoira, Y. L'Aminot, V. Ruzinov, "Vacuum properties of palladium thin film coatings", Vacuum, vol. 73 p. 139(2004).

Tetsuya Miyazawa, Yu Kano, Yasuo Nakayama, Kenichi Ozawa, Toshiharu Iga, Misao Yamanaka, Ayako Hashimoto, Takashi Kikuchi, Kazuhiro Mase, "Improved pumping speeds of oxygen free palladium/titanium nonevaporable getter coatings and suppression of outgassing by baking under oxygen", Journal of Vacuum Science and Technology A37, 021601(2019).

C. Benvenuti, P. Chiggiato, P. Costa Pinto, A. Escudeiro Santana, T. Hedley, A. Mongelluzzo, V. Ruzinov, I. Wevers, "Vacuum properties of TiZrV non-evaporable getter films", Vacuum, vol. 60 p. 57(2001).

* cited by examiner

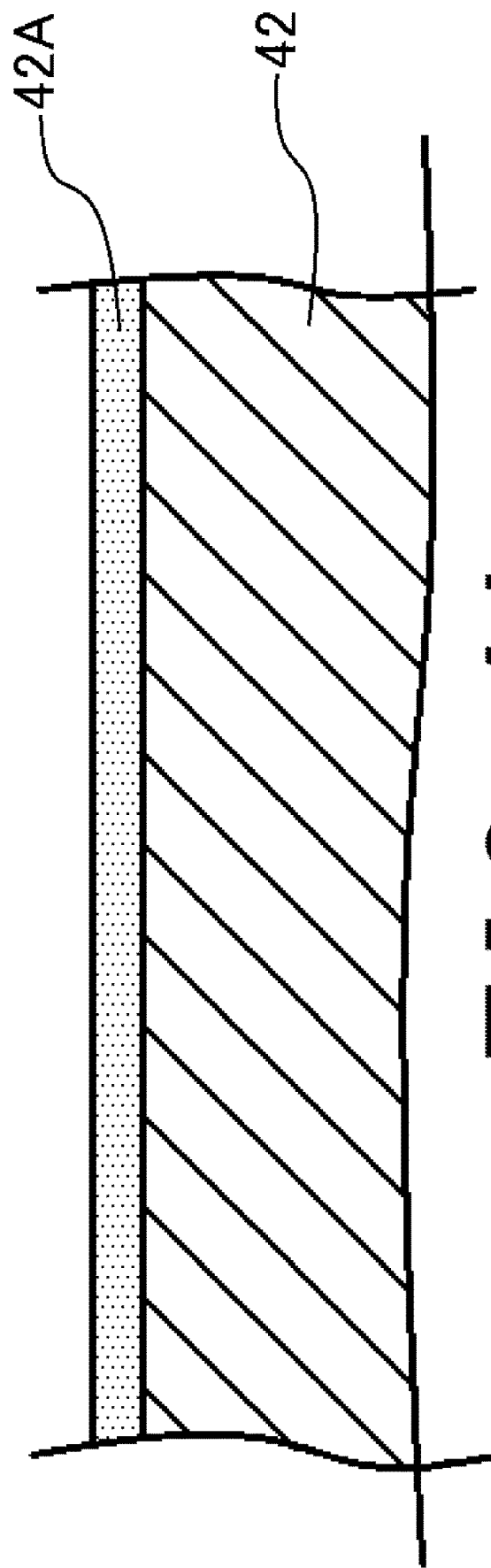

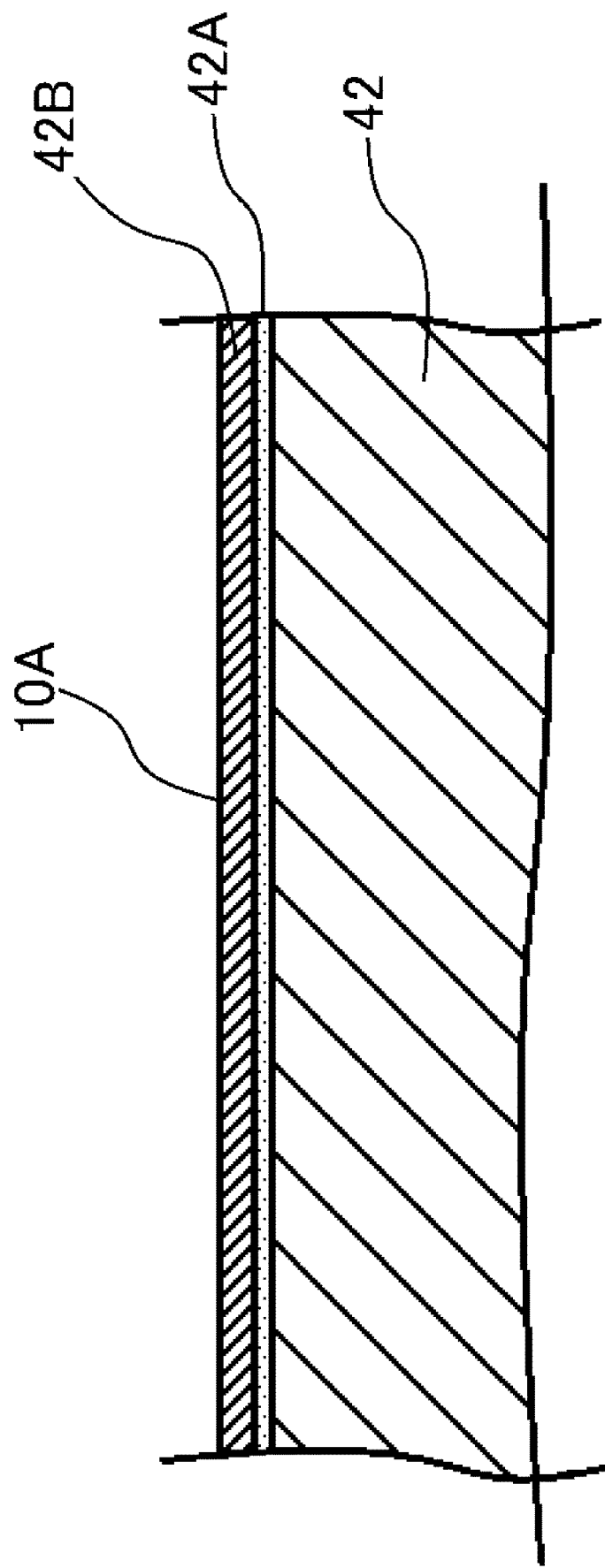

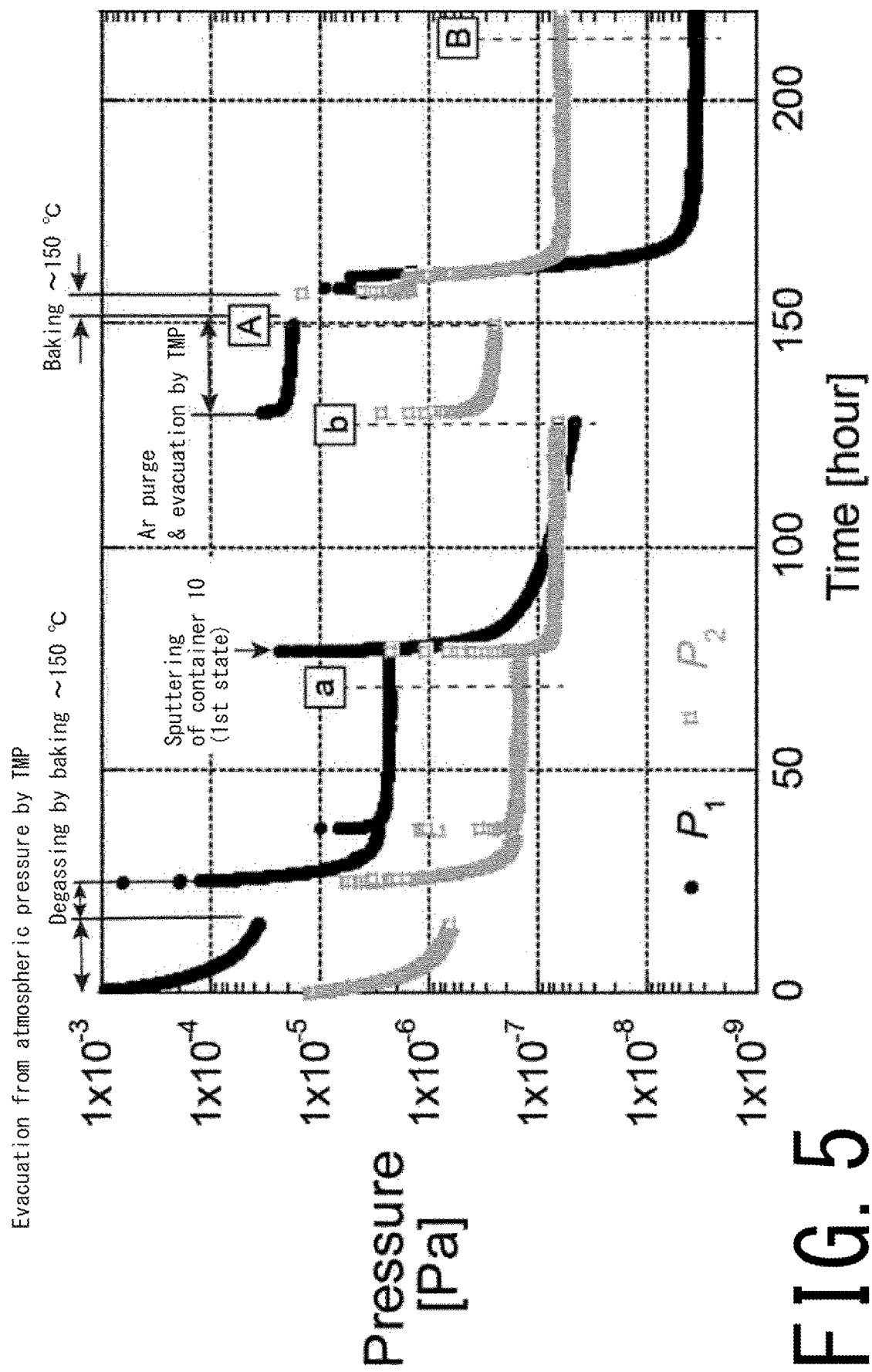

VACUUM COMPONENT AND EVACUATION METHOD USING THE SAME

INCORPORATION BY REFERENCE

This application is based on and claims the benefit of priority from Japanese Patent Application No. 2020-130226 filed on Jul. 31, 2020, the entire contents of which are hereby incorporated by reference.

BACKGROUND

The present invention relates to a vacuum component capable of evacuation by means of a gettering effect, and to an evacuation method using the vacuum component.

BACKGROUND ART

A vacuum pump using a gettering effect is employed in a variety of apparatuses requiring ultra-high vacuum, such as surface analyzers including electron microscopes (SEM, TEM), an X-ray photoelectron spectrometer (XPS) and a secondary ion mass spectrometer (SIMS), and accelerators of such as electrons and light and heavy ions, and the like. In these apparatuses, instruments and the like, the vacuum pump using a gettering effect has great advantages of no need of power during its functioning as a pump, and of no vibration. The no need of power is particularly effective also from the viewpoint of decarbonization when the vacuum pump is employed as a pump for evacuation inside a device such as a semiconductor device, a MEMS, or the like. Further, as the vacuum pump using a gettering effect has a large pumping speed for hydrogen (H) and the like, for which only a small pumping speed can be obtained by a turbomolecular pump and the like, it is particularly effective when employed in combination with another kind of vacuum pump (such as a turbomolecular pump) for obtaining an ultra-high vacuum that cannot be reached by employing only such another kind of vacuum pump.

Here, it is also possible to make a vacuum chamber itself have such a gettering effect. However, in general, a vacuum chamber (for example, a container for establishing a vacuum in the above-described analyzers and accelerators) is made of stainless steel or the like. Non-Patent Document 1 describes a technology of forming a thin film layer (NEG coating layer) containing a non-evaporable getter (NEG) material, such as titanium (Ti), zirconium (Zr), vanadium (V), hafnium (Hf) and niobium (Nb), on the inner surface of a vacuum chamber, in order to make the vacuum chamber itself have a gettering effect. As a result, for example, by forming an NEG coating layer on the inner surface of an accelerator beam pipe, it has become possible to make the beamline function as a continuous gettering type vacuum pump, and thereby to obtain an ultra-high vacuum uniformly even in a long beamline.

Non-Patent Document 2 and Patent Document 1 each describe a technology of further forming a thin film layer (noble metal layer) of a noble metal, such as palladium (Pd), gold (Au), silver (Ag) and platinum (Pt), on the above-described NEG coating layer, thereby suppressing oxidation of the NEG coating layer while maintaining its gettering effect, and accordingly suppressing deterioration in the function of the NEG coating layer. However, carbon dioxide and nitrogen cannot be captured by a coating layer of such noble metals.

In those cases, as the NEG coating layer is formed as a thin film layer on a stainless steel, the film thickness is limited owing to problems such as of peeling, and is accordingly set at, for example, about 1 μm. On the other hand, when a gas to be pumped out is hydrogen molecules, for example, the hydrogen molecules are diffusion-captured into the NEG coating layer, and accordingly the maximum number of captured molecules is limited by the film thickness. For example, it is recognized from Non-Patent Document 3 that, when an object to be pumped out is hydrogen molecules, an upper limit of the number of hydrogen molecules captured by the NEG coating layer of about 1 μm thickness is about $10^{14}$ to $10^{15}$ cm$^{-2}$.

When an object to be pumped out is water vapor, oxygen, carbon monoxide, carbon dioxide or nitrogen, the object produces an oxide, carbide, or nitride on the surface of the NEG coating layer, which suppresses subsequent performance of the molecule capturing. In that case, the gettering effect can be recovered (reactivated) by raising the temperature of the NEG coating layer to diffuse the oxide or the like described above into the inside of the NEG coating layer. However, in such reactivation, as described in Non-Patent Document 4, the degree of reactivation is limited by saturation of the diffusion amount of the oxide or the like within the NEG coating layer and, for example, the reactivation can be performed at most only 5 times when the thickness of the NEG coating layer is 1 μm.

In the case of forming a noble metal layer on the NEG coating layer, already described above, the number of reactivation cycles can be increased, as described in Non-Patent Document 2 and Patent Document 1. On the other hand, in that case, the presence of a noble metal layer makes it difficult to allow the NEG coating layer to capture carbon dioxide and nitrogen.

CITATION LIST

Patent Literature

[Patent Document 1] WO2018/097325

Non-Patent Literature

[Non-Patent Document 1] C. Benvenuti, J. M. Cazeneuve, P. Chiggiato, F. Cicoira, A. Escudeiro Santana, V. Johanek, V. Ruzinov, J. Fraxedas, "A novel route to extreme vacua: the non-evaporable getter thin film coatings", Vacuum, vol. 53 p 219 (1999)

[Non-Patent Document 2] C. Benvenuti, P. Chiggiato, F. Cicoira, Y. L'Aminot, V. Ruzinov, "Vacuum properties of palladium thin film coatings", Vacuum, vol. 73 p 139 (2004)

[Non-Patent Document 3] Tetsuya Miyazawa, Yu Kano, Yasuo Nakayama, Kenichi Ozawa, Toshiharu Iga, Misao Yamanaka, Ayako Hashimoto, Takashi Kikuchi, Kazuhiro Mase, "Improved pumping speeds of oxygen free palladium/titanium nonevaporable getter coatings and suppression of outgassing by baking under oxygen", Journal of Vacuum Science and Technology A37, 021601 (2019)

[Non-Patent Document 4] C. Benvenuti, P. Chiggiato, P. Costa Pinto, A. Escudeiro Santana, T. Hedley, A. Mongelluzzo, V. Ruzinov, I. Wevers, "Vacuum properties of TiZrV non-evaporable getter films", Vacuum, vol. 60 p 57 (2001)

SUMMARY OF INVENTION

Technical Problem

As described above, while the pumping capacity of the NEG coating obtained by means of its gettering effect is effective, there is a large limitation on the maximum number of captured molecules, and there also is a limitation on the working life (or the number of reactivation cycles). Accordingly, there has been a desire for a vacuum component that performs evacuation by means of a gettering effect with a large pumping capacity and a long working life.

The present invention has been made in view of the above-described issue, and accordingly is aimed at providing an invention to solve the issue.

Solution to Problem

In order to solve the issue, the present invention is configured as follows.

A vacuum component according to the present invention is a vacuum component having a pumping capacity by means of a gettering effect of titanium (Ti), the vacuum component including a vacuum container provided with a Ti layer with a thickness of 100 μm or larger containing Ti, the vacuum component evacuating a vacuum chamber to be a target of the evacuation, by being put into a state where either the Ti layer with no Ti oxide formed on the surface or a Ti oxide layer directly formed on the Ti layer in a manner to have a thickness of 1 nm or smaller or have a surface oxygen concentration of 20 atomic % or smaller is exposed on an inner surface of the vacuum container.

A vacuum component according to the present invention includes an electrode provided inside the vacuum container, the electrode having an electrode surface corresponding to its surface facing the inner surface of the vacuum container, and also includes a gas inlet for introducing an inert gas into the vacuum container, and the vacuum component is configured such that its state can be switched between a first state of generating DC discharge by introducing the inert gas into the vacuum container and setting the electrode surface at a positive potential and the inner surface at a negative potential, and a second state of setting the electrode surface at the same potential as the inner surface or setting the electrode surface in a floating state from the inner surface, without introducing the inert gas into the vacuum container, wherein the vacuum component is set to be in the second state when performing evacuation.

A vacuum component according to the present invention is a vacuum component having a pumping capacity by means of a gettering effect of titanium (Ti), the vacuum component including a vacuum container provided with a Ti layer of a thickness of 100 μm or larger containing Ti, wherein either on the Ti layer with no Ti oxide formed on the surface or on a Ti oxide layer directly formed on the Ti layer in a manner to have a thickness of 1 nm or smaller or have a surface oxygen concentration of 20 atomic % or smaller, a coating layer containing an NEG (Non-evaporable getter) material selected from Ti, zirconium (Zr), vanadium (V), hafnium (Hf) and niobium (Nb), or containing a noble metal selected from palladium (Pd), gold (Au), silver (Ag) and platinum (Pt) is directly formed, and the vacuum component evacuates a vacuum chamber to be a target of the evacuation, by being put into a state where the coating layer is exposed on an inner surface of the vacuum container.

In a vacuum component according to the present invention, the coating layer has a thickness of 10 μm or smaller.

A vacuum component according to the present invention includes an electrode provided inside the vacuum container, the electrode having an electrode surface corresponding to its surface facing the inner surface of the vacuum container, and also includes a gas inlet for introducing an inert gas into the vacuum container, and the vacuum component is configured such that its state can be switched among a first state of generating DC discharge by introducing the inert gas into the vacuum container and setting the electrode surface at a positive potential and the inner surface at a negative potential, a second state of setting the electrode surface at the same potential as the inner surface or setting the electrode surface in a floating state from the inner surface, without introducing the inert gas into the vacuum container, and a third state of generating DC discharge by introducing the inert gas into the vacuum container and setting the electrode surface at a negative potential and the inner surface at a positive potential, wherein the electrode surface is formed of a material constituting the coating layer, and the vacuum component is set into the second state when performing evacuation.

In a vacuum component according to the present invention, the electrode is configured to be attachable and detachable to the vacuum container.

In a vacuum component according to the present invention, the inner surface is cylindrically shaped, and the electrode is arranged along the central axis of the cylindrical shape.

An evacuation method according to the present invention uses the vacuum component, includes a heating process in which, after forming the coating layer by realizing the third state subsequently to the first state, the vacuum container is sealed after detaching the electrode from the vacuum container as necessary, and then is heated, and evacuates the vacuum chamber from the vacuum container side after the heating process.

In an evacuation method according to the present invention, the vacuum container is heated at a temperature of 300° C. or lower in the heating process.

An evacuation method according to the present invention uses the vacuum component, and includes a heating process in which the vacuum container is heated in a state of being sealed.

In an evacuation method according to the present invention, the vacuum container is heated at a temperature of 400° C. or lower in the heating process.

Advantageous Effects of Invention

As a result of being configured as described above, the present invention makes it possible to achieve a vacuum component for performing evacuation by means of a gettering effect with a large maximum number of captured molecules and a long working life.

BRIEF DESCRIPTION OF DRAWINGS

FIG. 4A is a diagram showing a cross-sectional structure near the surface of a general Ti layer.

FIG. 4B is a diagram showing a cross-sectional structure near the surface of a Ti layer on an inner surface of a vacuum component according to an embodiment of the present invention.

FIG. 5 is a diagram showing a result of measuring temporal change of the pressure of a vacuum component with a Ti layer being exposed, which is a first example of the present invention, and that of the pressure of a vacuum chamber to which the vacuum component is connected.

DETAILED DESCRIPTION

Hereinafter, a vacuum component according to an embodiment of the present invention will be described. The vacuum component is connected to a vacuum chamber and thereby functions as a vacuum pump for evacuating the vacuum chamber by means of a gettering effect. The vacuum chamber may be a component required to be in an ultra-high vacuum (for example, at a pressure of $5 \times 10^{-8}$ Pa or lower) that constitutes a part of a surface analyzer, such as an electron microscope (SEM, TEM), an X-ray photoelectron spectrometer (XPS) and a secondary ion mass spectrometer (SIMS), or of an accelerator or the like of electrons, light and heavy ions, and the like. Further, a vacuum container, which is a part of the vacuum component, itself may be used as a vacuum chamber to be evacuated. Furthermore, the vacuum component may be used as a getter pump within a small device such as a MEMS, even without having a form of a vacuum container but by having a surface structure shown in FIG. 4B, which will be described later.

Figure 1:
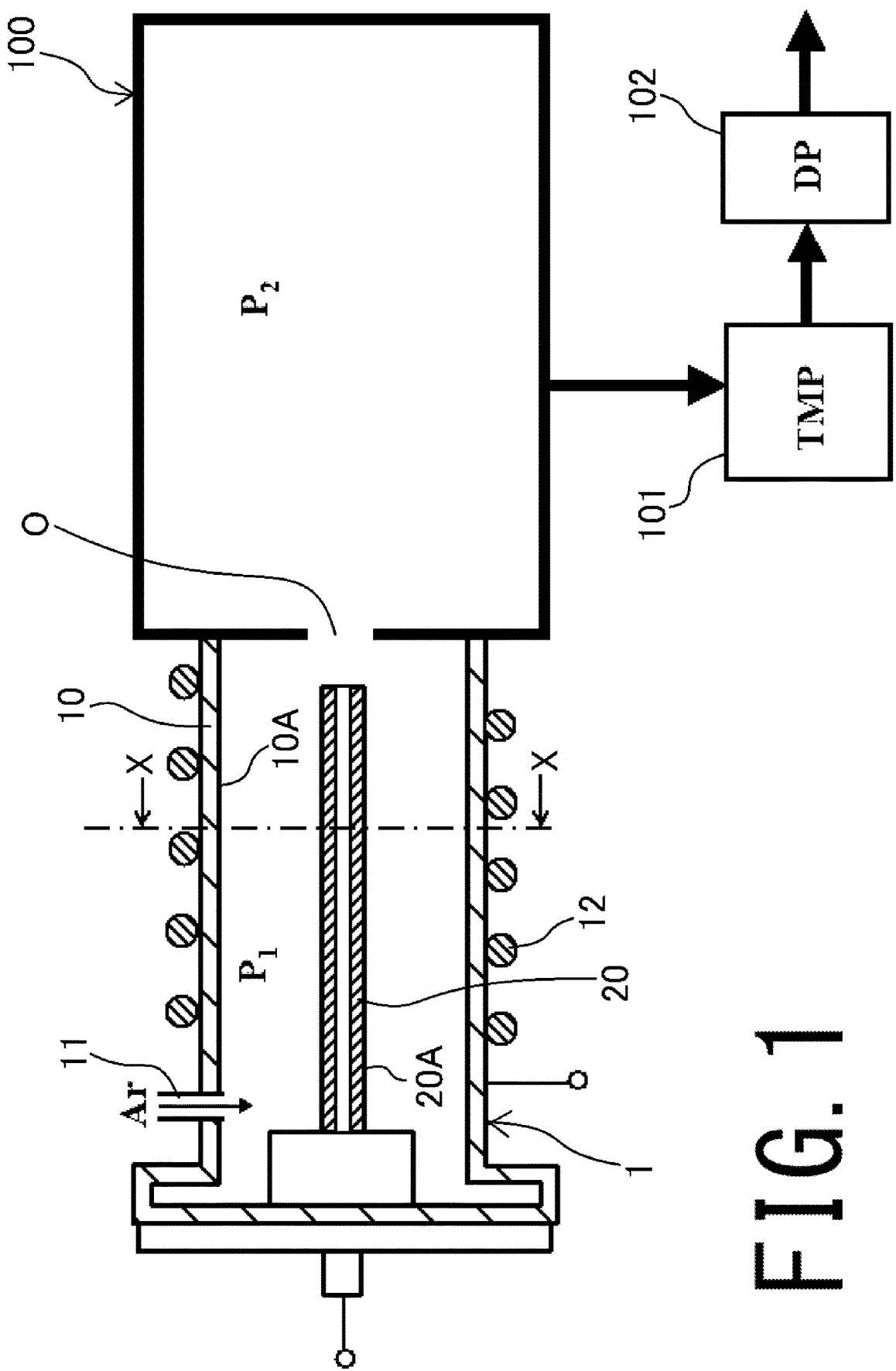
FIG. 1 is a partial cross-sectional view of a configuration used in measuring pumping characteristics of a vacuum component according to an embodiment of the present invention.
Figure 2:
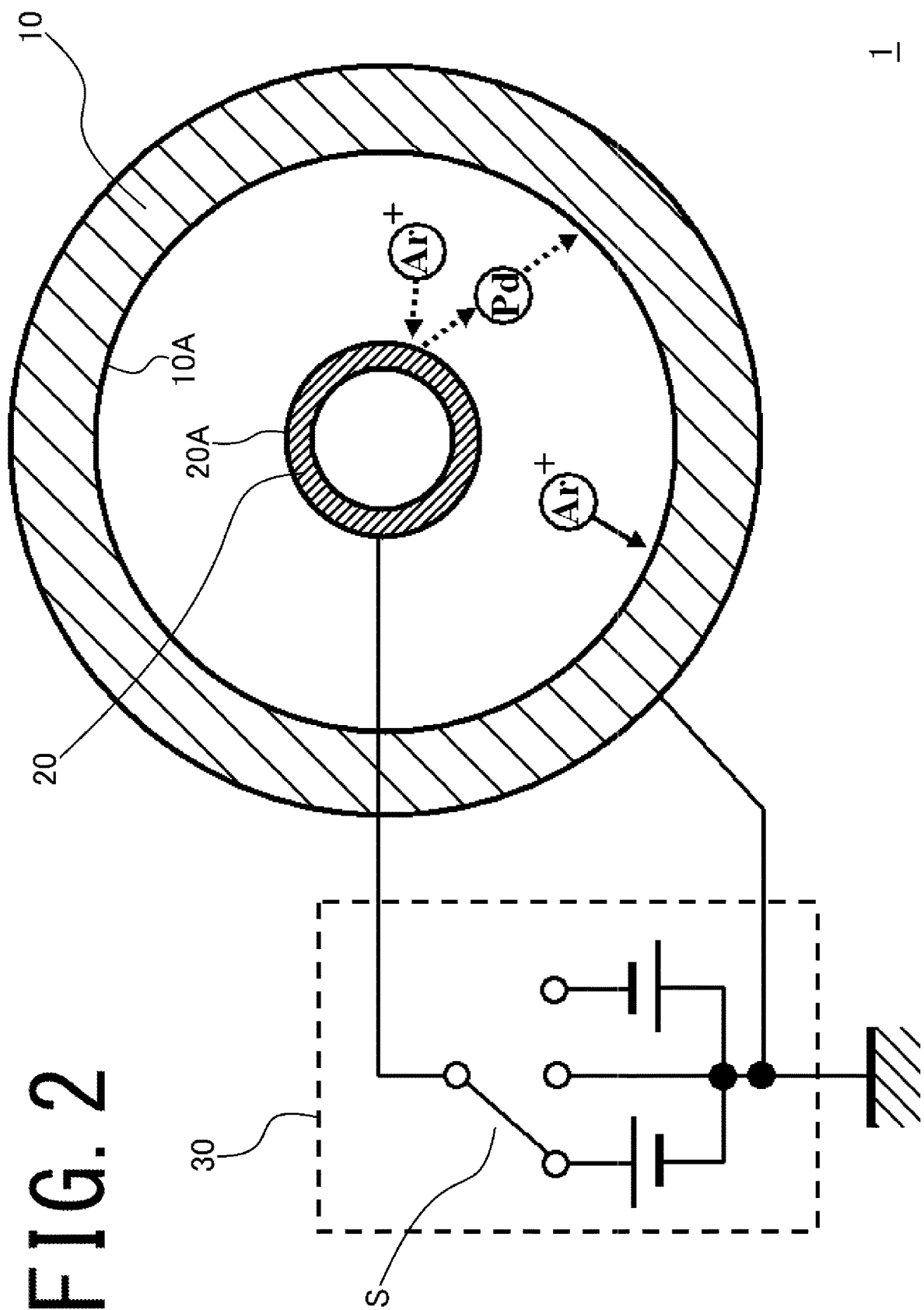
FIG. 2 is a cross-sectional view of a vacuum component according to an embodiment of the present invention.

FIG. 1 is a partial cross-sectional view of a configuration used in measuring pumping characteristics of such a vacuum component (vacuum pump) 1, and FIG. 2 is a cross-sectional view of the configuration in the X-X direction. In FIG. 1, a vacuum chamber 100 is evacuated by a TMP (turbomolecular pump) 101, and the backpressure side of the TMP 101 is evacuated by a DP (dry pump) 102. The vacuum component 1 includes a vacuum container 10 having a cylindrical inner surface 10A. FIG. 2 shows a cross section perpendicular to the center axis of the cylindrical shape. In FIG. 1, the inside of the vacuum container 10 and that of the vacuum chamber 100 are connected via an orifice O. Accordingly, the vacuum (pumping) capacity of the TMP 101 and that of the vacuum component 1 can be compared with each other, through the orifice O. When it is aimed to evacuate the vacuum chamber 100 by the vacuum component (vacuum pump) 1, the orifice O may be a simple opening of a similar size to the inner diameter of the vacuum container 10, and the opening is made smaller in the present case, for a purpose of evaluating characteristics of the vacuum component 1. Further, there is wound around the vacuum container 10 a coil-shaped heater (heating means) 12 for performing on the vacuum container 10 a heating process at 300° C. or below, which is for degassing and activation described later. The heater 12 does not need to be installed all the time, and the one having another form may also be used. A temperature sensor, or the like, to measure and control the temperature is appropriately installed, but its description is omitted.

In FIG. 1, pumping characteristics of the vacuum component (vacuum pump) 1 is measured by such as comparing a pressure of the vacuum container 10, P1, with a pressure of the vacuum chamber 100 evacuated by the TMP 101, P2.

The vacuum container 10 is made of Ti, which is one of NEG materials. However, the vacuum container 10 does not need to be entirely made of Ti, and what is required is that a portion constituting the cylindrical inner surface 10A is formed of a Ti layer having a sufficiently larger thickness than, for example, that of the NEG coating layers described in Non-Patent Document 1 and the like, such as a Ti layer of 100 μm or larger thickness. Accordingly, in an ideal case, the vacuum container 10 provides a pumping capacity by only itself, similarly to the NEG coating layers described earlier. Here, a vacuum gauge is appropriately connected to each of the vacuum container 10 and the vacuum chamber 100, whose pressures (degrees of vacuum) P1 and P2 respectively corresponding to the vacuum gauges are thus made measurable, but the vacuum gauges are not depicted in the drawings.

In an area around the central axis of the vacuum container 10, there is provided, along the central axis, a hollow cylindrical electrode 20 with its outer surface (electrode surface 20A) being sufficiently smaller than the inner surface 10A of the vacuum container 10. To the electrode 20 and the vacuum container 10, a power supply unit 30 is connected from the outside. In the power supply unit 30, a total of three states including two states of connecting respective ones of two DC power supplies having different polarities and a state of making direct connection not through a DC power supply are selectively switched by a switch S. That is, setting the vacuum container 10 (inner surface 10A) at the ground potential, switching among the three states of respectively setting the electrode 20 (electrode surface 20A) at positive, negative, and ground potentials is performed by the switch S. Here, the electrode 20 may be set into a floating state instead of the grounded state. In the power supply unit 30, a pulse power supply or the like may be used instead of the DC power supply. Further, as will be described later, the electrode 20 may be configured to be attachable and detachable to the vacuum container 10. In that case, the vacuum container 10 is configured to be capable of being sealed after detaching the electrode 20 from it.

The electrode surface 20A (outer surface of the electrode 20 when viewed from the central axis) is formed of an NEG material (a Group 4 or Group 5 element, such as Ti, zirconium (Zr), vanadium (V), hafnium (Hf) and niobium (Nb)) or a noble metal (such as palladium (Pd), gold (Au), silver (Ag) and platinum (Pt)). For this purpose, the electrode 20 may be the one entirely made of such a material, or may be the one with the electrode surface 20A covered with such a material. The NEG material or noble metal is used, in a third state described later, to coat the surface of the vacuum container 10 with it. Therefore, when only first and second states described later are realized, the electrode surface may be formed of general stainless steel, copper, or the like.

Further, the vacuum container 10 is provided with a gas inlet 11 enabling introduction of an inert gas (Ar) from the outside, and Ar pressure in the vacuum container 10 is made adjustable by means a flow control valve (not depicted) near the gas inlet 11. The Ar pressure and the absolute value of a potential at which the electrode 20 is made positive or negative in potential are set approximately at a value that can generate DC discharge between the electrode surface 20A and the inner surface 10A of the vacuum container 10 and thus generate a sputtering phenomenon.

With the configuration, it is possible, in the vacuum component 1, to realize any one of three states, including a first state of generating DC discharge by introducing Ar inside and setting the electrode surface 20A at a positive potential, a second state of setting the electrode surface 20A at a ground potential (or into a floating state) without introducing Ar, and a third state of generating DC discharge by introducing Ar inside and setting the electrode surface 20A at a negative potential. Pumping by the vacuum component 1 is performed in the second state. That is, unlike generally-used other vacuum pumps, such as an ion pump, which require power supply in pumping, the vacuum component 1 requires no power supply in its pumping in the second state.

As already described above, in the state where no Ar is introduced and no power is supplied to the electrode (the second state), the vacuum container 10 provides a pumping capacity by means of a getter effect of Ti of the inner surface 10A of the vacuum container 10, in an ideal case. In that case, an upper limit value of H2 capture by the Ti layer constituting the inner surface 10A is determined depending on the thickness of the Ti layer, and accordingly, by setting the Ti thickness at 100 µm or larger, as already described, the maximum number of captured molecules of the Ti layer can be increased to be a value an order of magnitude larger than that of such NEG coating layers as described in Non-Patent Document 3 and the like. That is, using thus configured vacuum container 10, a high pumping capacity can be maintained over a long period of time.

However, as Ti is a material easy to oxidize, an oxide of Ti (such as $TiO_2$ and TiO) is generally formed on the outermost surface of the inner surface 10A formed of Ti, in which case the gettering effect is suppressed. Particularly, in a state after the vacuum component 1 (vacuum container 10) is opened to the atmosphere, such a Ti oxide has been generally formed on the inner surface 10A.

In this respect, in the vacuum component 1, when Ar is introduced and the electrode 20 is set at a positive potential as described above (in the first state), Ar (positive) ions generated by DC discharge collide with the inner surface 10A of the vacuum container 10 corresponding to the negative potential side, as illustrated in FIG. 2 by a solid arrow inside the vacuum container 10. By this ion bombardment, the Ti oxide layer can be sputter etched and accordingly removed. After the electrode 20 is subsequently switched into a grounded state and remaining Ar is pumped out by the TMP 101, thereby realizing the second state, a clean Ti surface, from which the Ti oxide layer has been removed, is exposed on the inner surface 10A of the vacuum container 10. As a result, a high gettering effect in the vacuum container 10 can be achieved. This is obvious from the fact, shown in FIG. 5 described later, that the pressure P1 of the vacuum container 10 is lower, by even an order of magnitude, than the pressure P2 of the vacuum chamber 100 evacuated by the TMP 101. Accordingly, a high pumping capacity can be maintained over a long period of time, as already described. In this case, an etching depth of the Ti oxide layer can be adjusted by the sputtering time (DC discharge time), sputtering current and the like.

On the other hand, when Ar is introduced and the electrode surface 20A is set at a negative potential after removing the Ti oxide layer as described above (in the third state), Ar (positive) ions collide with the electrode surface 20A corresponding to the negative potential side, inversely to the above-described case. By this ion bombardment, atoms of the electrode material (NEG material or noble metal) on the electrode surface 20A are sputtered and emitted from the surface, and the atoms of the electrode material are deposited on the inner surface 10A present more outside. In this way, when the electrode material is a noble metal such as Pd, for example, a noble metal layer can be formed on the Ti layer from which the Ti oxide layer has been removed. As a result, it becomes possible to provide a gettering effect of Ti while suppressing deterioration in the effect, similarly to described in Non-Patent Document 2 and Patent Document 1. A thickness of the noble metal layer (coating layer) in this case can also be adjusted by the sputtering time (DC discharge time), sputtering current and the like.

Figure 3:
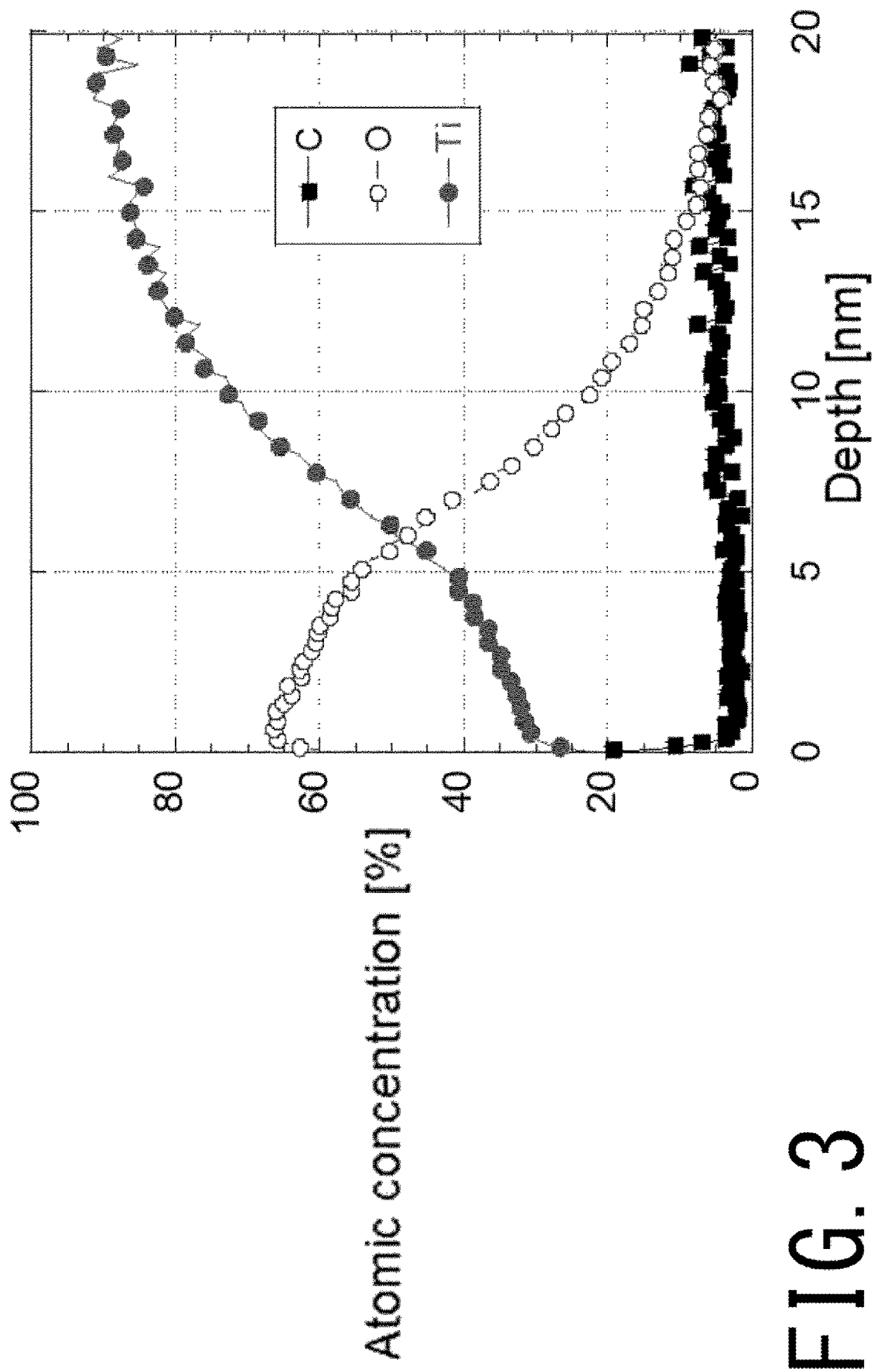
FIG. 3 is a diagram showing a result of compositional depth analysis near the surface performed on a layer formed of Ti, after exposing the layer in the atmosphere.

FIG. 3 is a result of measuring a compositional depth profile (Ti, oxygen and carbon) of a layer formed of Ti (corresponding to the Ti layer on the inner surface 10A) near its surface by Auger electron spectroscopy (AES), after exposing the layer in the atmosphere. From this result, it can be confirmed that in the layer formed of Ti, the oxygen concentration is high and the Ti concentration is low on the surface side, and a Ti oxide of 5 nm or larger thickness is formed on the outermost surface, which is because Ti is a material easy to oxidize. The Ti oxide is composed of $TiO_2$, TiO or the like.

FIGS. 4A and 4B are cross-sectional diagrams each schematically showing a structure near the surface of the Ti layer 42 constituting the inner surface 10A, where FIG. 4A shows a state before the above-described sputter etching is performed, and FIG. 4B shows a state after experiencing the above-described first state (sputter etching) and third state (formation of the coating layer). Here, the drawings are made assuming that the shape of the cylindrical inner surface 10A is a planar one because the curvature radius of the inner surface 10A is sufficiently large.

In FIG. 4A, a Ti oxide layer 42A having a thickness of 5 nm or larger is formed on the surface of the Ti layer 42, as shown in FIG. 3. In this respect, in the vacuum component 1 described above, as the Ti oxide layer 42A can be sputter etched by Ar ions in the first state, the Ti oxide layer 42A can be removed or sufficiently thinned as shown in FIG. 4B, and the gettering effect of the Ti layer 42 accordingly can be enhanced.

In that case, to achieve a sufficient gettering effect, the Ti oxide layer 42A is preferably removed completely. It is alternatively preferable to make a remaining thickness of the Ti oxide layer 42A sufficiently small, specifically 1 nm or smaller, or to make its surface oxygen concentration 20 at % or lower.

Here, heating the vacuum container to a high temperature is necessary when removing or sufficiently thinning the Ti oxide layer 42A by raising the temperature, but no such heating is necessary when the above-described sputter etching is performed. That is, performing only either of the sputter etching and the heating may be taken as a way of achieving the gettering effect.

By thus removing or sufficiently thinning the Ti oxide layer 42A and subsequently establishing the third state, it is possible to form, for example, a noble metal layer (coating layer 42B) formed of Pd, for example, when the electrode material is a noble metal Pd. In this case, while the noble metal layer protects the surface of the Ti layer 42, its thickness is preferably small for achieving a sufficient gettering effect by the Ti layer 42. The thickness is preferably set at about 50 nm as described in Non-Patent Document 3, and is set at 10 µm or smaller at the most. In also a case of coating an NEG material, which will be described later, a thickness of the coating layer is set at 10 µm or smaller at the most (usually about 1 µm) in order to avoid peeling of the coating.

For a material constituting the noble metal layer, gold (Au), silver (Ag) or platinum (Pt) may also be used, as a material providing a similar effect to that of Pd. Further, instead of the noble metals, a Group 4 or Group 5 element functioning as an NEG material similarly to Ti, such as zirconium (Zr), vanadium (V), hafnium (Hf) and niobium (Nb), may be used, while its effect is different from that of the noble metal layer. In that case, it is possible to select a material having a high ability to capture a molecular species to be pumped out, as a material used for forming an NEG coating layer, depending on the molecular species. By forming the electrode surface 20A using such a material, the coating layer 42B in FIG. 4B can be formed of such a material. Ti may be used for the coating layer 42B, similarly to the Ti layer 42.

Thus formed coating layer 42B has a function to suppress oxidation of the surface of the Ti layer 42 underneath it. It is said that, when the coating layer 42B of an NEG material is used, $O_2$, CO or the like is bonded with the NEG material of the surface of the coating layer 42B and accordingly produces an oxide. It also is said that, when the coating layer 42B of a noble metal is used, such a molecule described above is physically adsorbed onto the surface. In each of the cases, when the surface of the coating layer 42B is covered with the oxide or the adsorbed molecules, the gettering effect is decreased. The oxide produced on the surface of the coating layer 42B of the NEG material is diffused into the inside of the NEG coating layer 42B by heat treatment at about 200° C. (a heating process, which will be described later), and is further diffused down into the Ti layer 42, from which the Ti oxide layer 42A has been removed. As the Ti layer 42 is sufficiently thick as already described, saturation of the oxide within the Ti layer 42 is unlikely to occur, which enables repeated activation without imposing such restriction on the number of available uses (the number of available cycles of recovering the pumping characteristics by activation) as that imposed in the cases of the NEC coatings used in the prior art. As the adsorbed molecules on the surface of the coating layer 42B of a noble metal is released into the vacuum by heat treatment at about 150° C., activation of the surface can be repeatedly performed, as described in Non-Patent Document 2 and Patent Document 1. That is, such a heating process at a low temperature of 300° C. or lower as described above is effective when the coating layer 42B is formed of either an NEG material or a noble metal.

The coating layer 42B also transmits hydrogen down into the Ti layer 42. It is said that both the NEG materials and noble metals allow hydrogen to diffuse within them. Hydrogen diffuses into the coating layer 42B of such a material and further down into the Ti layer 42, from which the Ti oxide layer 42A has been removed. As the Ti layer 42 is sufficiently thick, the maximum number of captured molecules for hydrogen in the Ti layer 42 can be made very large. That is, when the coating layer 42B is formed of either an NEG material or a noble metal, a high ability to capture hydrogen by the underlying thick Ti layer 42 is maintained. As a result, there is no such restriction on the ability to capture hydrogen as that imposed in the cases of using such coatings as described already in Patent Documents 1 and Non-Patent Documents 1 to 4.

In a case where the Ti layer 42 is exposed, re-sputtering is required after the Ti oxide layer 42A is formed again by opening to the atmosphere, but, arranging the coating layer 42B of an NEG material or noble metal in the above-described way enables reactivation at a low temperature of 300° C. or lower, for example, about 200° C., as described above. As the thick Ti layer 42 is provided underneath the coating layer 42B, the pumping capacity is not deteriorated even by repeating the reactivation.

In that case, the electrode 20 may be configured such that it can be detached from the vacuum container 10 after forming the coating layer 42B of an NEG material or noble metal in the third state. In that case, a pumping capacity is achieved by means of only the vacuum container 10 after detaching the electrode 20 from it. Further, when the pumping (adsorption) capacity is decreased in that state, it can be recovered by performing the reactivation in that state.

In an evacuation method in the just-described case where the vacuum chamber 100 is evacuated by the vacuum component 1 (vacuum container 10), there is performed a heating process for reactivating the vacuum container 10 having been sealed after detaching the electrode 20 from it and opening it to the atmosphere, by heating the vacuum container 10 using the heater 12. In the heating process, only a low temperature (300° C. or lower, for example, about 200° C.) is required, as described above. There, the vacuum container 10 may be evacuated from the side of the vacuum chamber 100, in FIG. 1, via the orifice O or another path, by the TMP 101.

Thus, in the above-described case, a high pumping capacity by the vacuum component 1 (vacuum container 10) can be achieved by performing the heating process after detaching the electrode 20. The operation can be performed many times, and the pumping capacity of the vacuum component 1 (vacuum container 10) by means of a gettering effect can be recovered each time. The configuration not including the electrode 20 is particularly effective for some kinds of applications.

In an alternative case where such a coating layer 42B as described above is not formed and the Ti layer 42 or the thin Ti oxide layer 42A is used in a state of being exposed, it is not necessary to realize the third state, and a material other than those described above may be appropriately used as a material constituting the electrode surface 20A.

In the above example, while it has been described that sputtering is generated by DC discharge between the electrode surface 20A and the inner surface 10A in the first and third states, a known method of magnetron sputtering may be used in order to make the sputtering easier to occur. In that case, it is only necessary to arrange a plurality of magnets (permanent magnets) at least at either the electrode 20 or the vacuum container 10, in a manner to produce a magnetic field perpendicular to the electrode surface 20A and the inner surface 10A. Thus, efficiency of the sputtering (sputter etching) can be particularly increased. Such arrangement of the magnets is easy because the vacuum container 10 and the electrode 20 each have a simple structure, as shown in FIGS. 1 and 2.

Hereinafter, a description will be given of a result of measurement on the vacuum component 1, which has been described above and was practically fabricated here, by using the system shown in FIG. 1. Here, the vacuum chamber 100 in FIG. 1 also was configured to have a cylindrical shape concentric with the vacuum container 10, the inner diameters of the vacuum chamber 100 and the vacuum container 10 were set at 150 mm and 95 mm, respectively, their lateral lengths in FIG. 1 were both set at 200 mm, and the diameter of the electrode 20 was set at 20 mm. The inside of the vacuum chamber 100 and that of the vacuum container 10 were connected by the orifice O with a conductance of 0.002 m$^3$/s. The vacuum chamber 100 was evacuated by the TMP 101 having a pumping speed of 300 L/s. The thickness of the vacuum container 10 was set at 3 mm, a pure titanium (JIS Type 2) and a titanium alloy (JIS Type 60: Ti-6A1-4V) were used as a material of the vacuum container 10, and almost the same measurement result was obtained for the two types of titanium materials. Results shown in FIGS. 5 to 8 are those obtained in the case of the JIS Type 60 material.

In the present case, DC discharge was generated when Ar was introduced into the vacuum container 10, with its pressure being set at 2 Pa, and a potential difference between the electrode 20 (positive side) and the vacuum container 10 was set at 250 V, where the discharge current was 250 mA. The number of Ar ions incident on the inner surface 10A corresponding to the discharge current is about $10^{18}$/s and, as a sputtering yield of Ti by 300 eV Ar$^+$ is reported to be about 0.65 atoms/ion, an etching rate of Ti oxide sputter etched under this condition is calculated to be about $10^{18}$/s. For example, when sputter etching 500 single atomic/molecular layer (assuming a thickness of about 50 nm with an atomic density of $10^{19}$ atoms/m$^2$ per single atomic/molecular layer), a time required for etching the inner surface 10A of the vacuum container 10 having the above-described configuration, at the above-described etching rate, is calculated to be about 700 seconds. That is, the Ti oxide layer can be sufficiently removed by holding the first state for about 10 minutes.

FIG. 5 shows a result of measuring change with time of the pressure P1 in the vacuum container 100 and the pressure P2 in the vacuum chamber 100, in the above-described configuration, when evacuation was performed after exposing the inside of the vacuum chamber 100 and that of the vacuum container 10 to the atmosphere. In the present case, which is referred to as a first example, only the sputter etching of Ti oxide layer was performed and no coating layer was formed. Here, in the initial stage, the vacuum component 1 was set into the second state (with no Ar introduction and no electrification), and evacuation by the TMP 101 was performed all the time.

Subsequently, 20 hours after the start, baking was performed at 150° C. for degassing, which caused temporary increase in both P1 and P2, but both P1 and P2 decreased to respective almost constant values at a time denoted by the character a after ending of the baking, where a relation P1>P2 was kept in the entire period until the time a. That is, in this period, evacuation by the TMP 101 was dominant and no evacuation effect by the vacuum component 1 was recognized, in the system of FIG. 1.

Subsequently, about 75 hours after the start, the sputter etching of Ti oxide layer was performed, as already described, for about an hour. Both P1 and P2 temporarily increased at that time owing to Ar introduction, but they both decreased, similarly to the case just described above, after the Ar introduction was stopped and the sputter etching was ended (the second state was established). At a time denoted by the character b after that, P1 and P2 each became lower than their respective values at the time a, and additionally, their relation became P1<P2. This indicates that the evacuation effect by the vacuum component 1 became larger than that by the TMP 101 at that time. That is, the pumping speed of the vacuum component 1 in this state became significantly higher than that of the TMP 101, 300 L/s.

Then, immediately after the time b, Ar was introduced to the atmospheric pressure and evacuation was performed again. As the gas introduced at that time was Ar and no oxygen was introduced, it is estimated that no Ti oxide layer was formed on the inner surface 10A at that time. Subsequently, baking was performed again at a time denoted by the character A, and both P1 and P2 decreased after ending the baking and became sufficiently low at a time denoted by the character B, where particularly, P1 became significantly lower than its value at the time b, and was 1/10 of P2 or lower. That is, no Ti oxide layer was formed on the inner surface 10A by the Ar introduction, and a high pumping capacity of the vacuum component 1 was accordingly maintained. It can be said that the pumping speed of the vacuum component 1 in that state is about one order of magnitude larger than that of the TMP 101, 300 L/s.

In the present case where no coating layer is formed, a Ti oxide layer has been formed on the inner surface of the vacuum container 10 in a state where the sputter etching was not performed. An investigation was made on an effect of performing only the heating but no sputter etching in the state. There, in a configuration different from that shown in FIG. 1, the vacuum container 10 was evacuated by a turbomolecular pump and subsequently was heated, where the heating was performed in a state with no evacuation obtained by closing a valve between the vacuum container 10 and the turbomolecular pump, and change of the pressure with time since starting the state was measured. At that time, the same measurement was performed on a case where the vacuum container was made of SUS (stainless steel) in place of Ti, as a comparative example.

Figure 6:
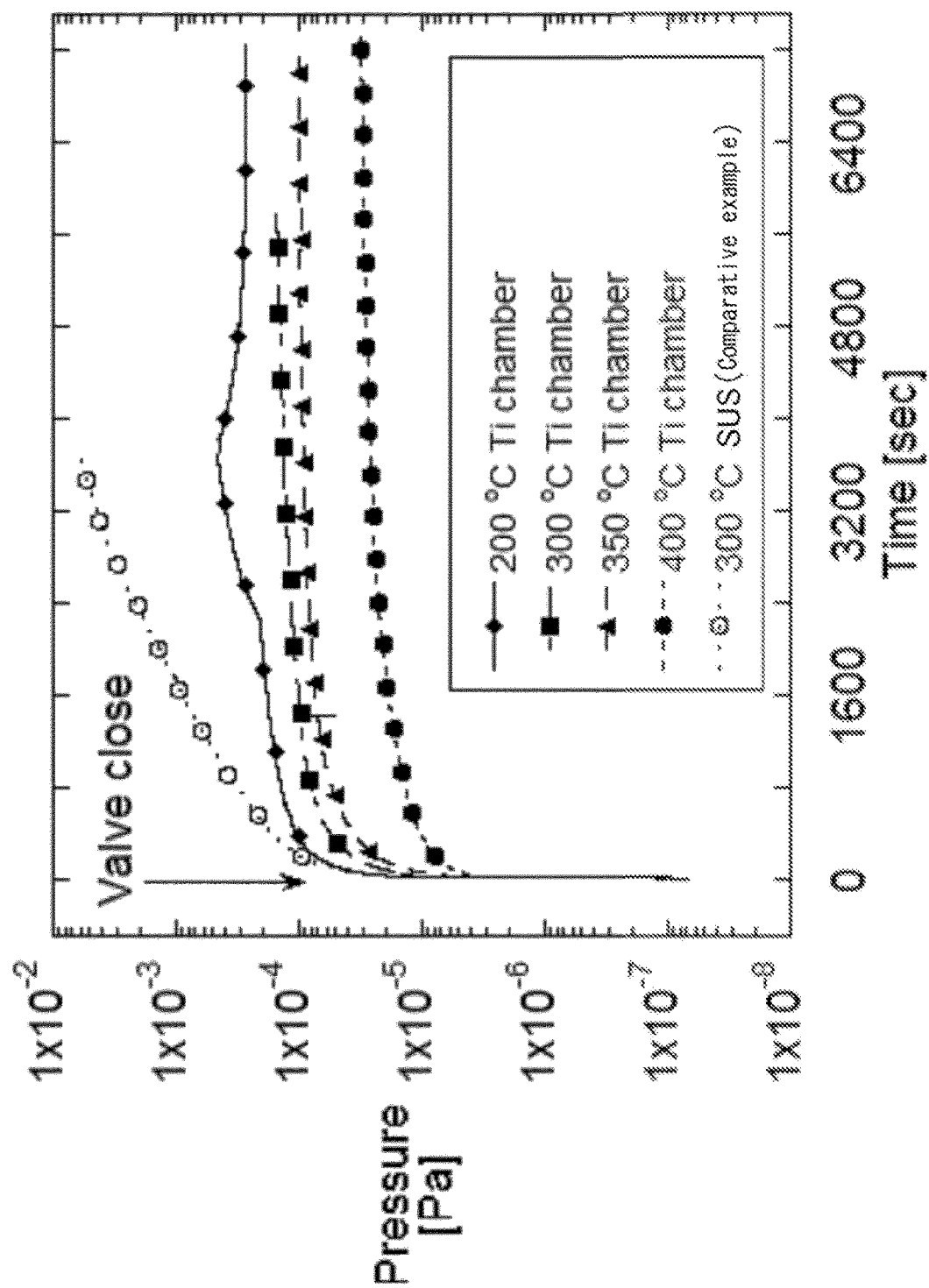
FIG. 6 is a diagram showing temporal change of pressures when pumping from outside is not performed after only a heating process is performed without performing sputter etching, in the first example of the present invention and in a comparative example.

FIG. 6 is a result of measuring change of the pressure with time since a point of time at which evacuation by the turbomolecular pump was stopped (the valve was closed). Here, the heating temperature was set at values from 200 to 400° C. (at only 300° C. for the comparative example). This result indicates that the pressure was kept lower in the example using the vacuum container 10 made of Ti, compared to that in the comparative example using SUS in place of Ti. This effect was larger for higher heating temperatures.

Figure 7:
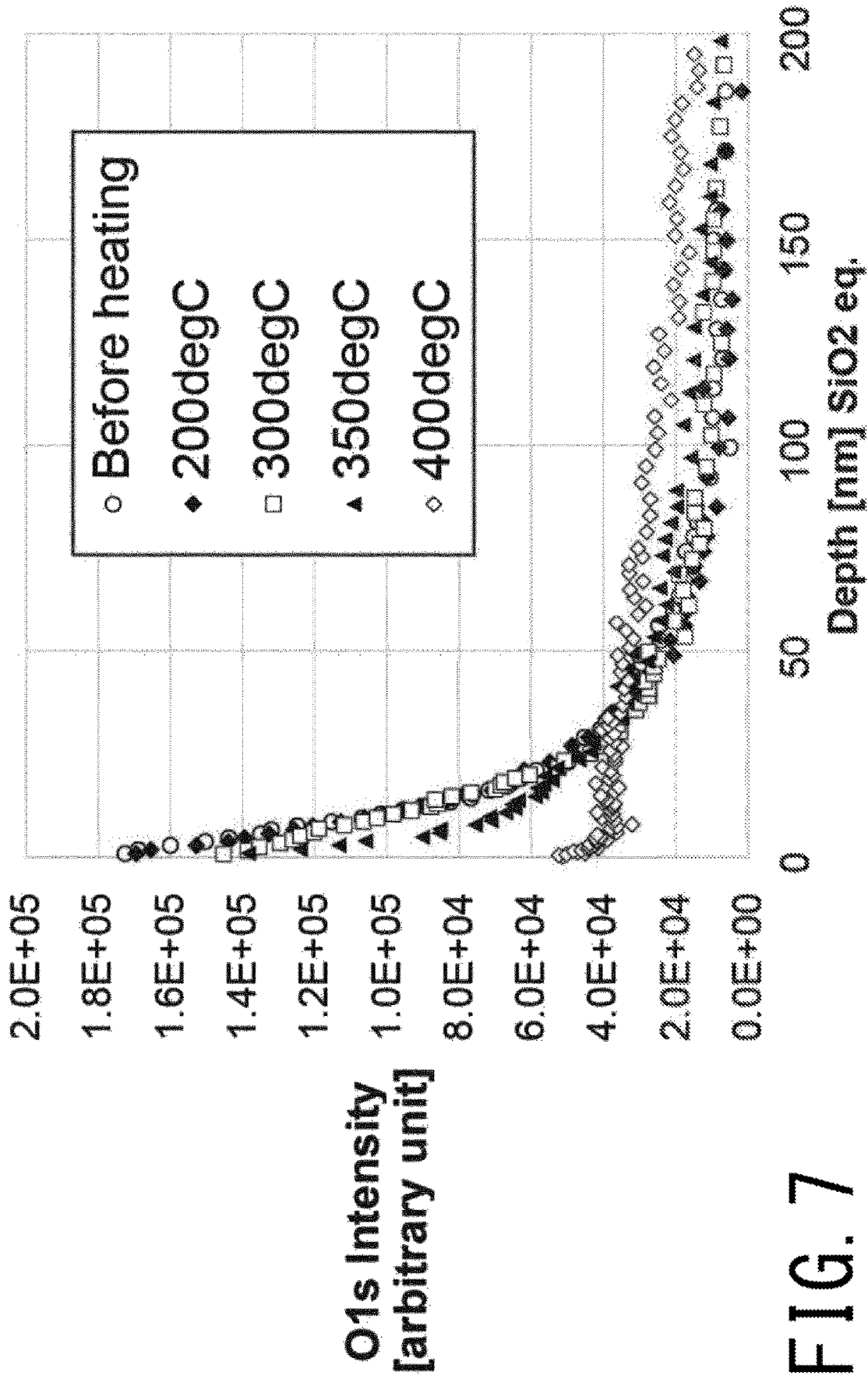
FIG. 7 is a diagram showing a result of measuring oxygen depth profiles near the surface of a sample simulating a vacuum container made of Ti in which no coating layer is formed, while changing temperature of heating.

To investigate this point, a near-surface depth profile of oxygen (O) was measured, by XPS (X-ray Photoelectron Spectroscopy), on a sample made of Ti with its surface having been oxidized, similarly to the vacuum container 10 described above, performing the above-described heating on the sample. FIG. 7 shows a result of the measurement (oxygen depth profiles). Here, the depth represented by the horizontal axis is an SiO$_2$ equivalent value. From this result, it can be recognized that oxygen is segregated to the surface as expected, and that, by the heating, the oxygen is not evaporated but is diffused inside. When the heating temperature is higher, the oxygen is diffused more inside, and the oxygen concentration at the outermost surface accordingly decreases. The fact that deterioration in the degree of vacuum (increase in the pressure) is smallest when the heating temperature is highest (400° C.) in FIG. 6 is supposed to be because oxygen is removed from the outermost surface of the vacuum container 10 in the above-described manner, and the surface accordingly becomes in a state closer to that achieved after performing sputter etching.

From also a viewpoint of that oxygen is not evaporated from the surface but is diffused inside by the heating, as described above, the vacuum container 10 (Ti layer) is preferably thick. That is, when the Ti layer is formed to have a large thickness, pumping effect by the vacuum container 10 can be obtained by performing the heating process at 400° C. or below, even in the case of not performing the sputter etching.

Figure 8:
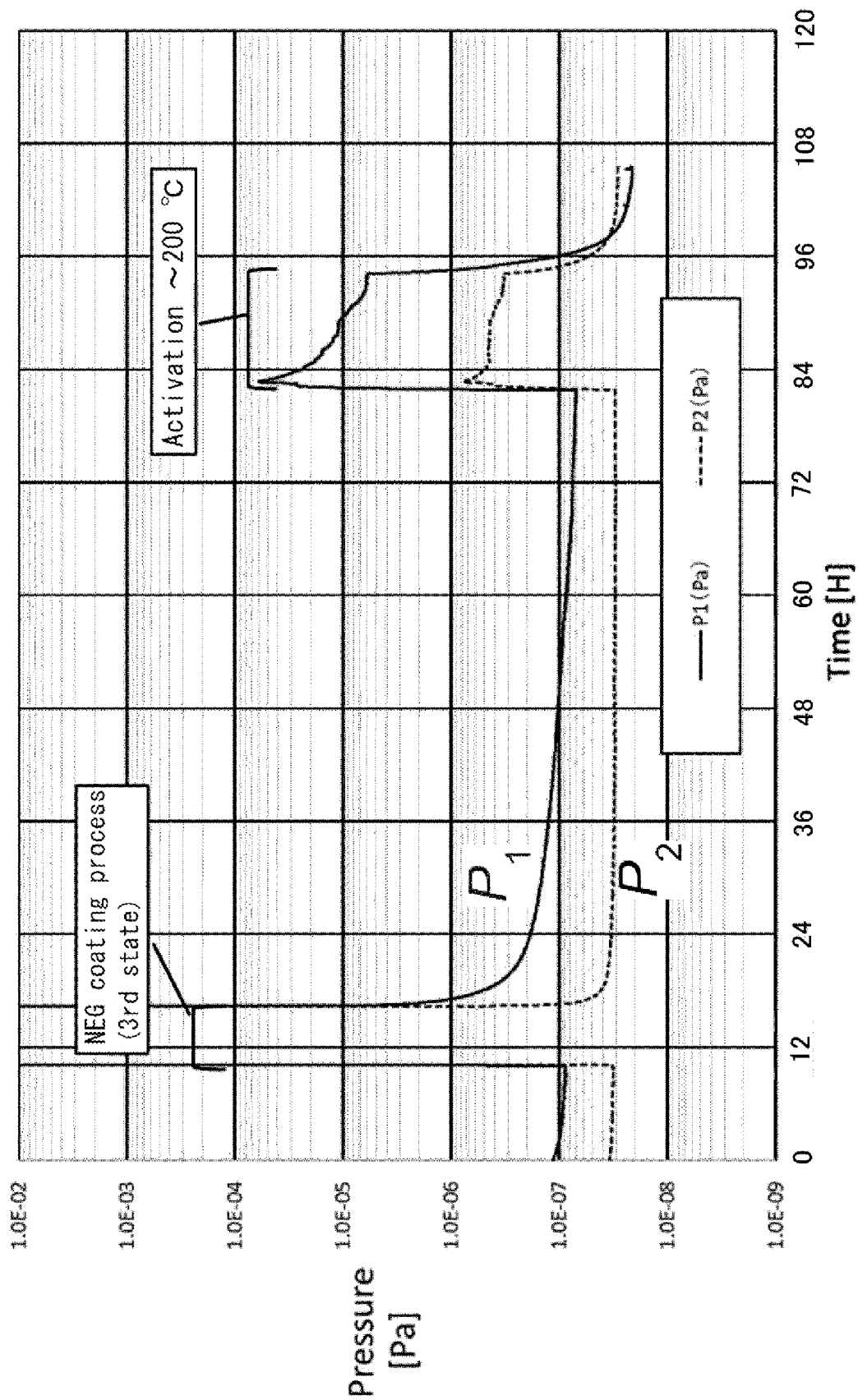
FIG. 8 is a diagram showing a result of measuring temporal change of the pressure of a vacuum component with a Ti layer being exposed and an NEG coating layer being subsequently formed, which is a second example of the present invention, and that of the pressure of a vacuum chamber to which the vacuum component is connected.

FIG. 8 shows a result of measuring change of the pressures with time, similarly to that in FIG. 5, in a case where both the sputter etching of Ti and formation of the coating layer were performed, as a second example. In the present case, at about 12 hours after the start, the coating layer of an NEG material (Ti, Zr, V or Hf) was formed after sputter etching the Ti oxide layer similarly to in the case of FIG. 5. Subsequently, after about 84 hours passed from the start, baking (activation) was performed. In the period until that point of time, a relation P1>P2 was kept, similarly to in the previous case, that is, the pumping capacity by the TMP 101 exceeded that by the vacuum component 1.

However, at 100 hours after the start, where sufficient time passed from the baking, the relation became P1<P2, that is, the pumping capacity by the vacuum component 1 exceeded that by the TMP 101, and finally a P1 value of $2 \times 10^{-8}$ Pa was obtained. That is, a high pumping capacity was achieved also in the case where the coating layer formation was performed.

Figure 9:
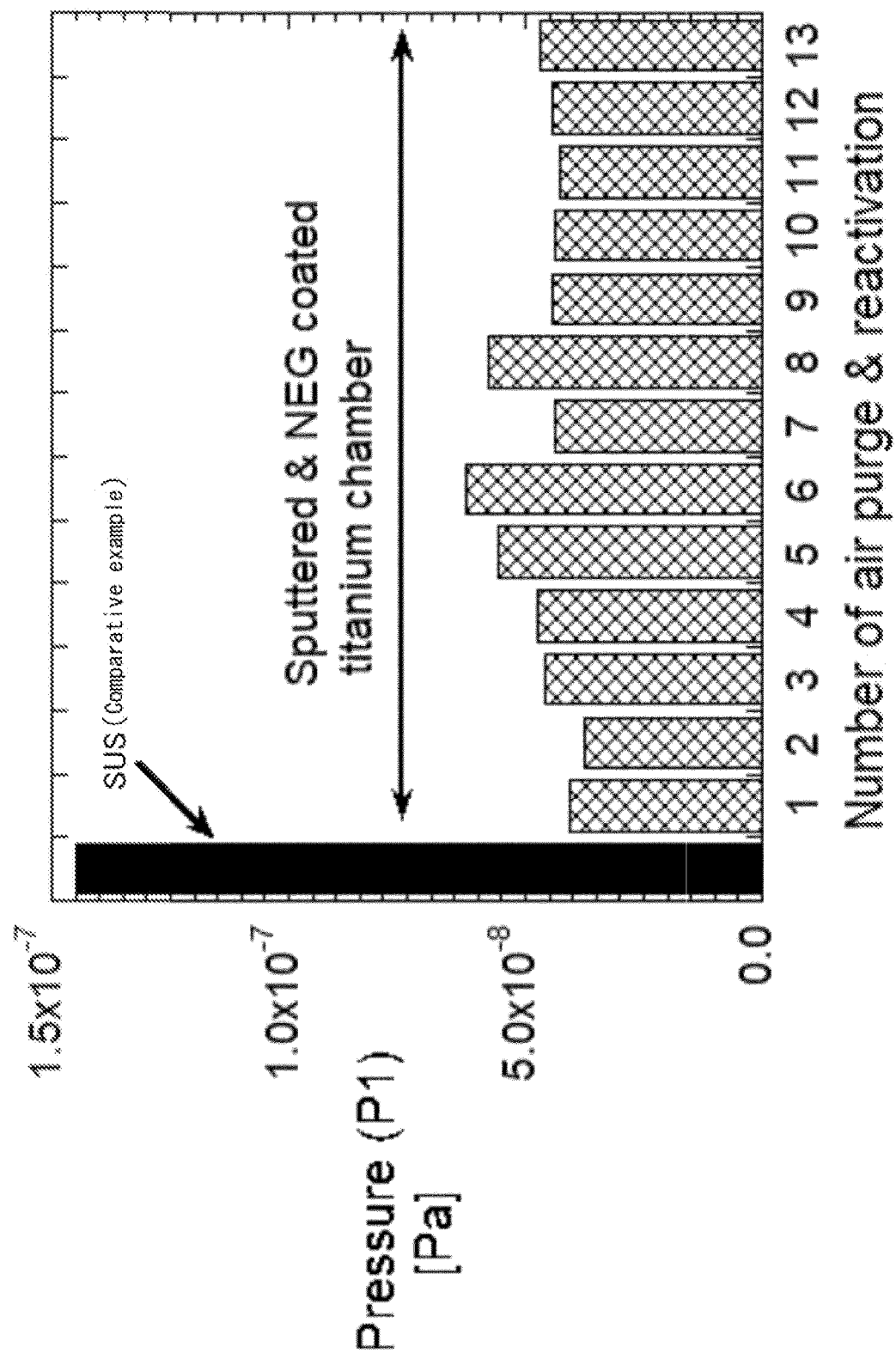
FIG. 9 is a diagram showing a result of measuring reached pressures when exposure to the atmosphere and a heating process are repeated a plurality of cycles, in the second example.

As already described, in the case of thus performing the coating layer formation, oxidation of the Ti layer underneath the coating layer is suppressed, and accordingly, after exposure to the atmosphere, the evacuation capacity can be recovered by performing only reactivation (a heating process) at a low temperature, even when a process such as the sputter etching is not performed. FIG. 9 shows reached pressures after thus repeating the exposure to the atmosphere and the heating process (activation) a plurality of cycles (up to 13 cycles), in the configuration of the second example. There, similarly to in FIG. 6, a result on a comparable example using a vacuum container made of SUS is also shown. From the results, it is recognized that, in the case of the example using the vacuum container 10 made of Ti (having the coating layer), a lower pressure than in the case of the comparative example using the vacuum container made of SUS was obtained even after 13 cycles. That is, as described above, when the coating layer is used, the pumping capacity can be recovered by only a heating process at a low temperature (300° C. or lower) even after exposure to the atmosphere.

Figure 10A:
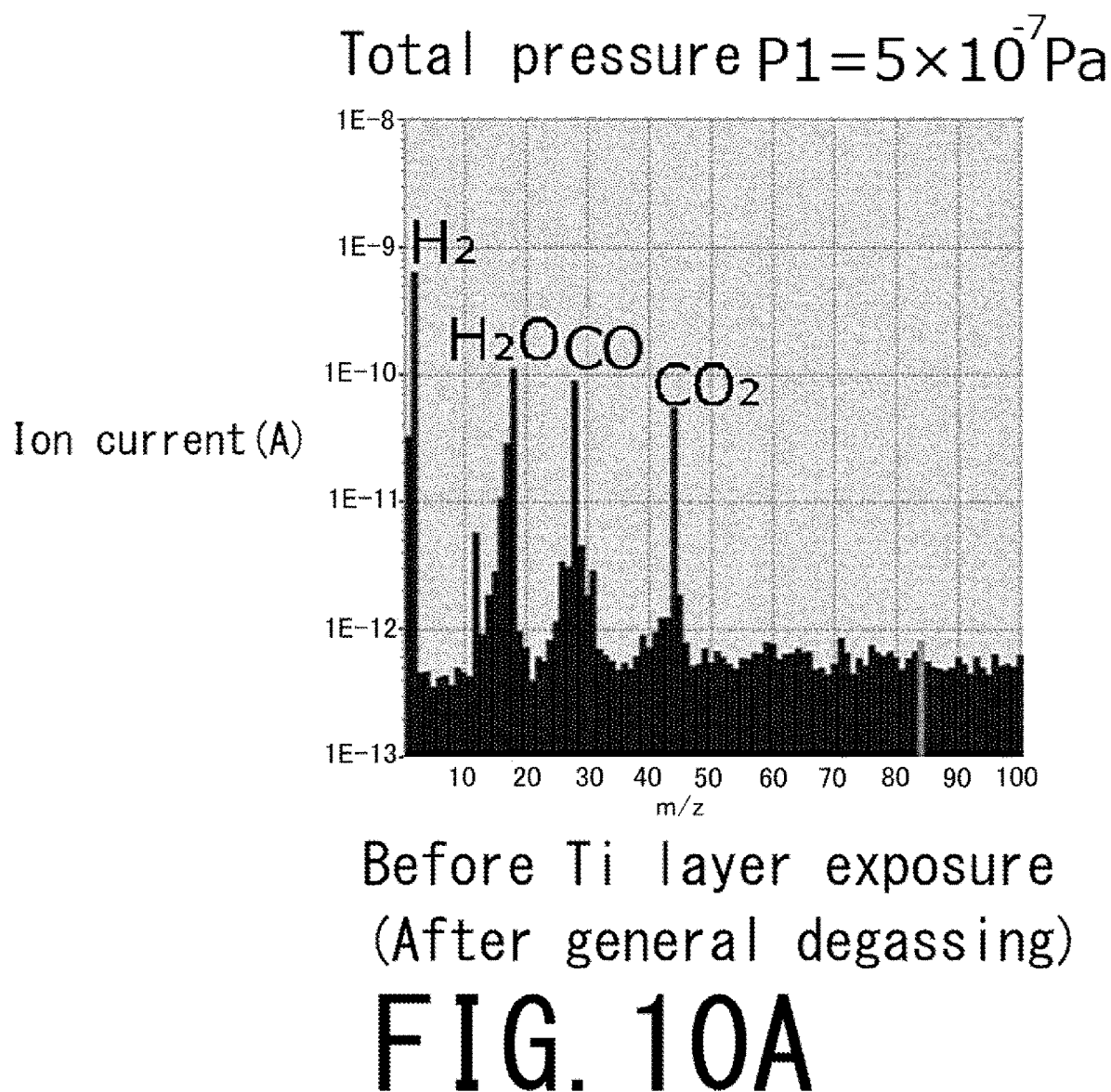
FIG. 10A is a diagram showing part 1 of a result of measuring partial pressures of various gases before and after evacuation by the vacuum component of the first example of the present invention.
Figure 10B:
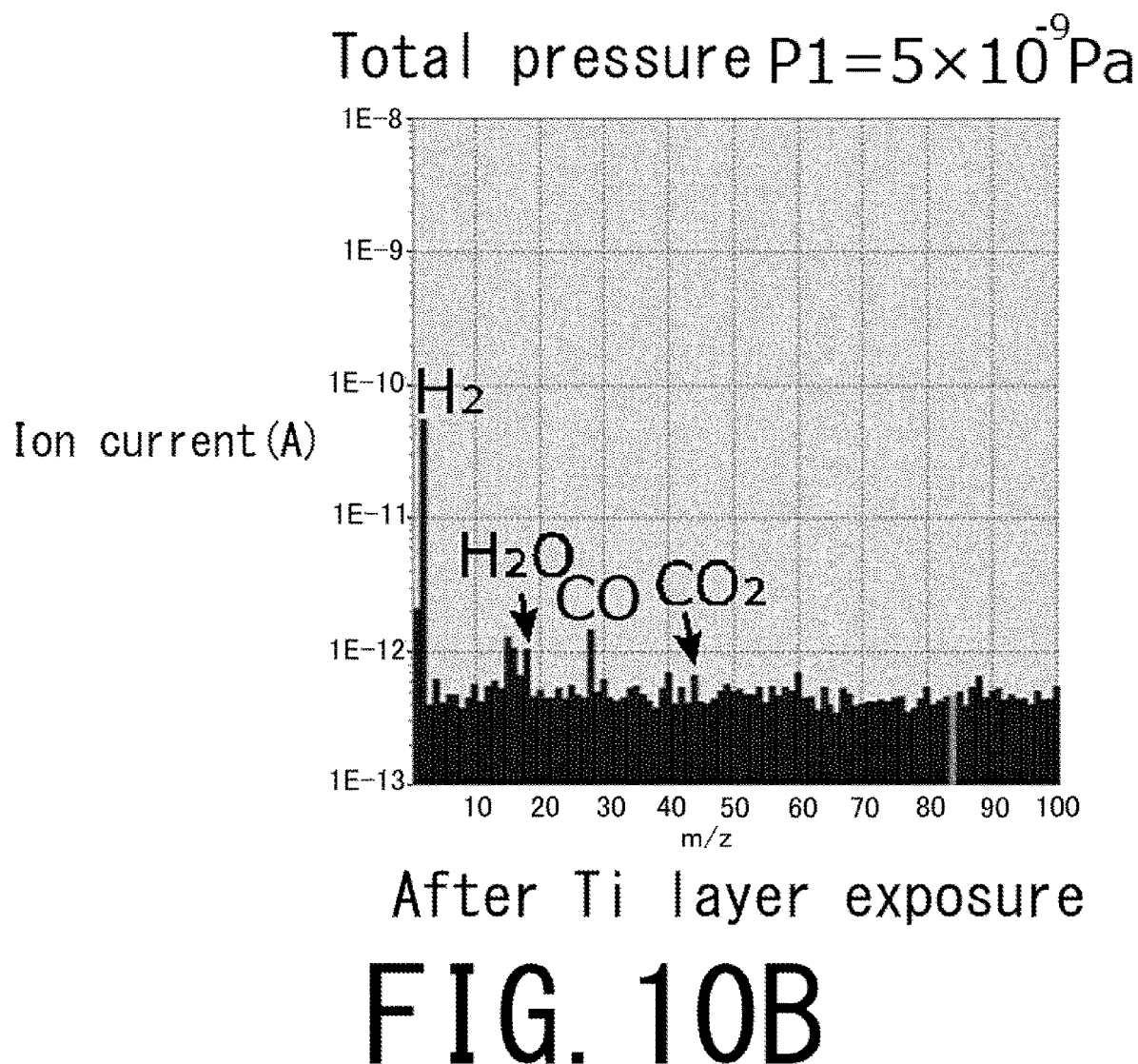
FIG. 10B is a diagram showing part 2 of the result of measuring partial pressures of various gases before and after evacuation by the vacuum component of the first example of the present invention.

Next, a description will be given of a result of analyzing a partial pressure of each component of residual gas by quadrupole mass spectrometry. FIGS. 10A and 10B show, respectively, a result of the analysis performed after baking (degassing) in a state where no coating layer was formed and a thick Ti oxide layer remained and was exposed (FIG. 10A), and a result of the analysis performed after a certain time passed since performing sputter etching of the Ti oxide layer subsequently to the former analysis (FIG. 10B), which respectively correspond to analyses before and after evacuation by the first example. There, peaks of $H_2$, $H_2O$, CO and $CO_2$ molecules are particularly recognized, and the height of the $H_2$ peak decreased to 1/10 and those of the $H_2O$, CO and $CO_2$ peaks decreased to 1/50 or smaller after the sputter etching (FIG. 10B), with reference to their respective values before the sputter etching (FIG. 10A). That is, it was confirmed that the vacuum component corresponding to the first example has a particularly high pumping capacity for these molecules.

Figure 11A:
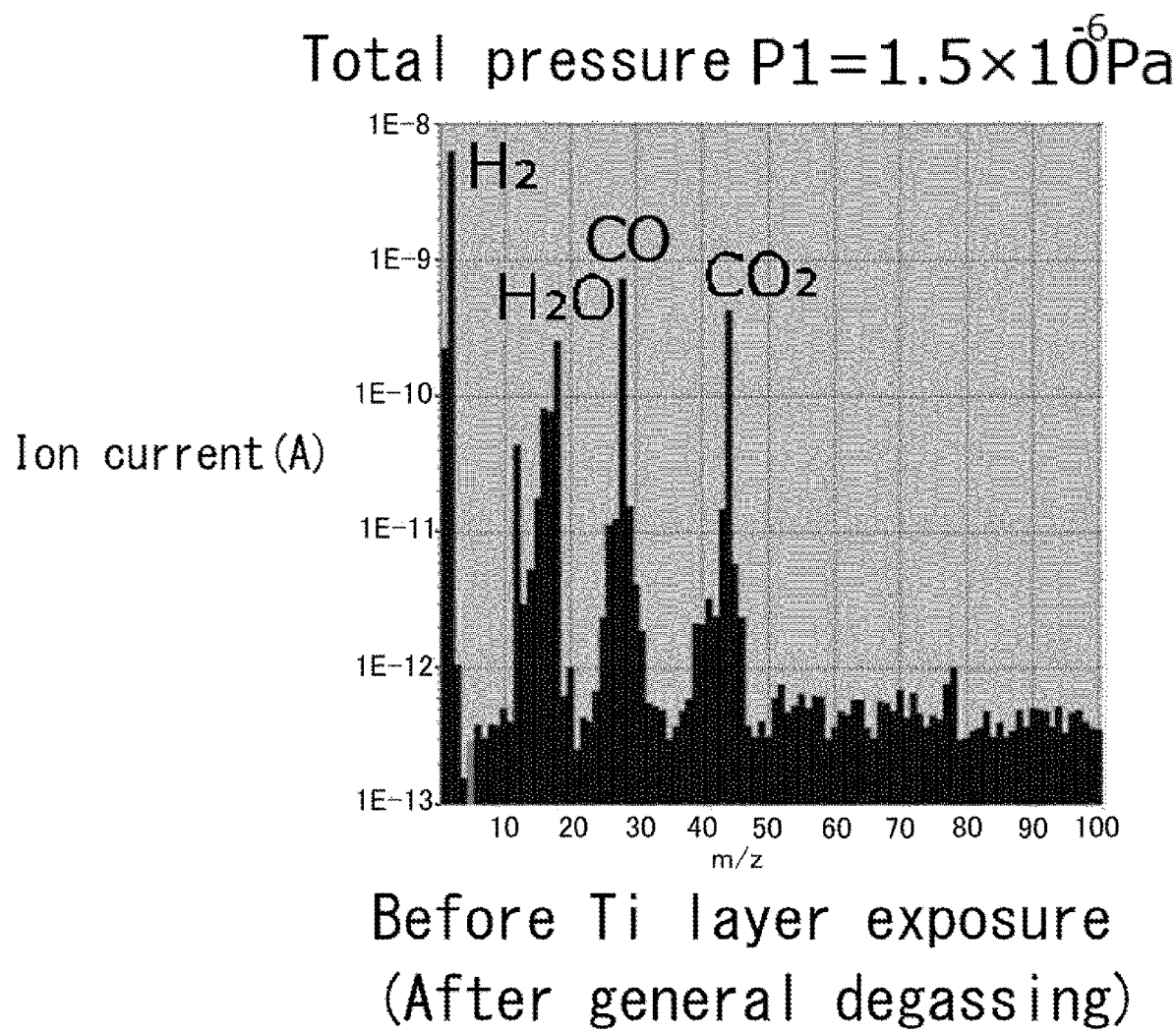
FIG. 11A is a diagram showing part 1 of a result of measuring partial pressures of various gases before and after evacuation by the vacuum component of the second example of the present invention.
Figure 11B:
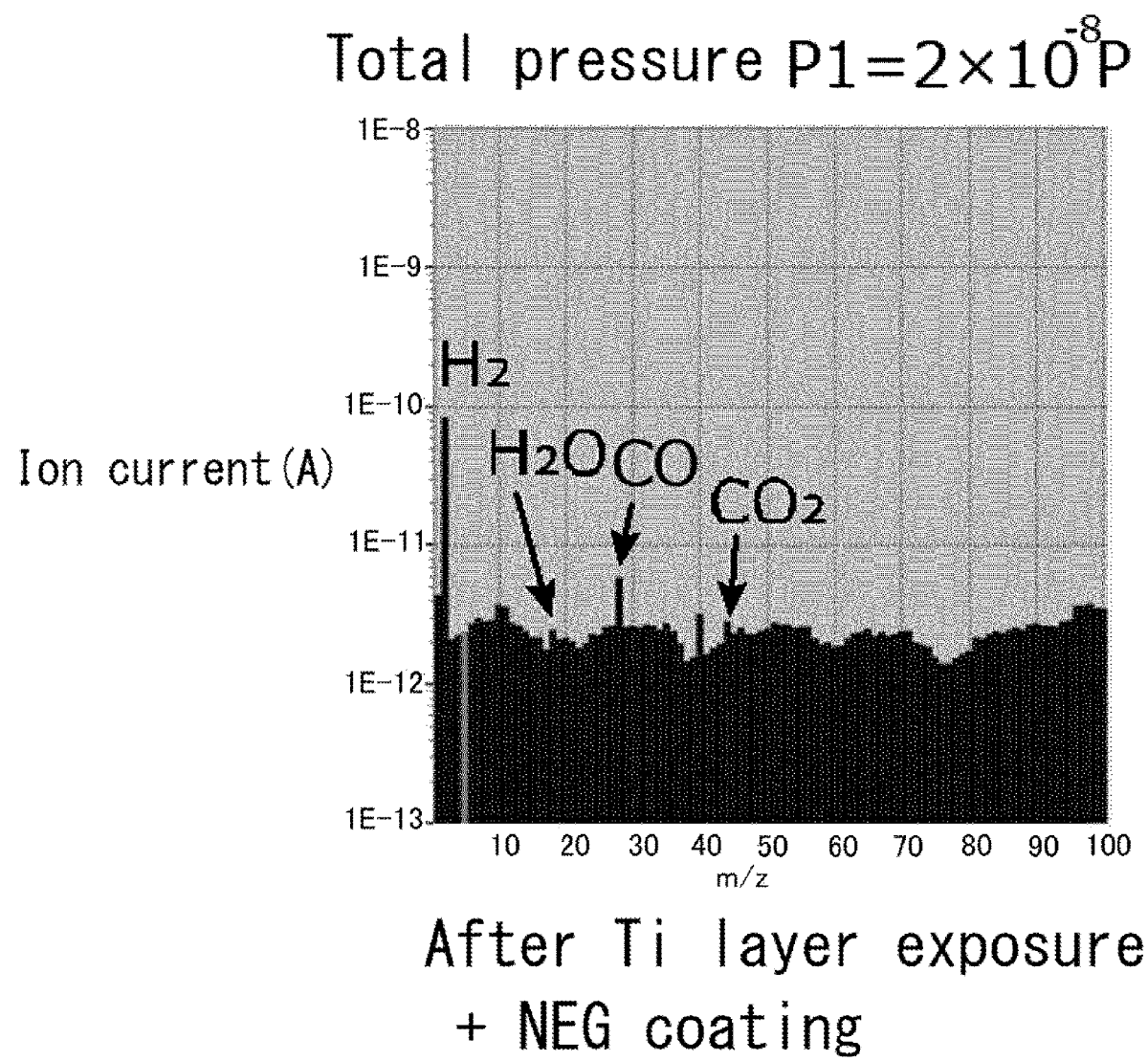
FIG. 11B is a diagram showing part 2 of the result of measuring partial pressures of various gases before and after evacuation by the vacuum component of the second example of the present invention.

FIGS. 11A and 11B show results of performing similar analysis to that of FIGS. 10A and 10B when the coating layer of an NEG material (Ti, Zr, V or Hf) was formed, which respectively correspond to analyses before and after evacuation by the second example. FIG. 11A shows a result of the analysis performed, similarly to that of FIG. 10A, after baking (degassing) in a state where no coating layer was formed and a thick Ti oxide layer remained and was exposed, and FIG. 11B shows a result of the analysis performed after a certain time passed since performing sputter etching of the Ti oxide layer and subsequent coating layer formation. From the results, in which the height of the $H_2$ peak decreased to 1/70 and those of the $H_2O$, CO and $CO_2$ peaks decreased to 1/90 or smaller, with reference to their respective values before the sputter etching (FIG. 10A), it was confirmed that the vacuum component corresponding to the second example has a particularly high pumping capacity for these gases.

As described above, after the Ti oxide layer 42A is removed, the vacuum component 1 has a high pumping capacity in a state of no power supply. The pumping capacity may be deteriorated as a result of the fact that the Ti oxide layer 42A having a large thickness is formed when the vacuum container 10 is opened to the atmosphere, and that even when the Ti oxide layer 42A is removed, the Ti oxide layer 42A gradually becomes thick during a long time elapsed after the removal. However, the pumping capacity can be recovered by performing sputter etching for removal of such a thick Ti oxide layer.

In the vacuum component 1, every time the sputter etching is performed to remove the Ti oxide layer 42A formed on the surface of the Ti layer 42, the thickness of the Ti layer 42 is reduced. However, when the Ti layer 42 is configured to have a large initial thickness, such as 100 μm or larger, a ratio of the thickness reduction is small, and the sputter etching accordingly can be performed many times. Alternatively, the Ti loss by the sputter etching may be substantially compensated by forming the coating layer 42B made of Ti. As a result, the sputter etching can be performed a sufficiently large number of times. Further, even when the coating layer 42B has been formed, the coating layer 42B and the Ti oxide film 42A underneath it may be sputter etched.

In the above example, it is assumed that the cylindrical inner surface 10A and the electrode 20 are used, and the Ti layer 42 is formed to entirely cover the inner surface 10A. However, the inner surface of the vacuum container and the electrode may be appropriately configured to have any shape that allows sputtering to be performed between them similarly to described above. Further, the Ti layer does not necessarily need to be formed on the entire inner surface and, depending on its form, a form of the electrode is appropriately determined.

The Ti layer does not necessarily need to be made of pure Ti, but any alloy of Ti and another metal that allows obtaining a gettering effect by Ti may also be used. Also in that case, Ti oxide layer formation on the surface of the Ti layer similarly occurs, and accordingly the configuration described above may be employed.

The above description applies also to the coating layer, and the noble metals or NEG materials already described may be used in a form of either a pure metal or an alloy that similarly provides the effect of the coating layer. While it has been described that, in the above examples, the sputtering is performed by introducing an inert gas Ar into the vacuum container 10, any other gas not forming a compound with Ti or an NEG material or noble metal to be used may be used in place of Ar.

In the above examples, a vacuum container with its inner surface composed of a Ti layer at least partially and an electrode are used. It is obvious, however, that a vacuum container having a similar inner surface to the above-described one has a similar degree of pumping capacity to that of the above-described vacuum container. That is, such a vacuum container having a similar inner surface to the above-described one can be used in a manner of connecting it to a vacuum chamber required to be evacuated. There, by providing the vacuum container with an electrode and a power supply unit, it becomes possible to use the vacuum container, which intrinsically is not installed as a vacuum pump, as a vacuum pump having a high pumping capacity. That is, an existing vacuum container (vacuum component) that has not been used as a vacuum pump can be easily made capable of being used as the above-described vacuum pump. Here, a vacuum container itself may be made of Ti or a Ti alloy, as it is possible to make the vacuum container itself have a gettering effect by thus using Ti or a Ti alloy as a material of the vacuum container.

While the vacuum chamber 100 and the vacuum container 10 are distinguished from each other in FIG. 1, the Ti layer does not necessarily need to be formed on the entire inner surface of the vacuum container, as described above, and accordingly, when the Ti layer is formed to partially cover the inner surface, distinction between a part of the vacuum container with no Ti layer and the vacuum chamber is not clear. Therefore, practically, distinction between the vacuum chamber (target of evacuation) and the vacuum container is optional, and, for example, the vacuum chamber and the vacuum container may be the same and single component. For this reason, even when, for example, the Ti layer and the like are formed partially or entirely on the inner surface of a vacuum chamber, similarly to in the above description, the entire configuration of the vacuum chamber is regarded as corresponding to the vacuum component described above.

As already described, particularly, in the case of having a coating layer made of an NEG material or noble metal, the pumping capacity by a gettering effect can be recovered by reactivation at a temperature of 300° C. or lower (for example, about 200° C.) even when the vacuum container is in a form of including nothing but itself as a result of detaching the electrode from it. Such a configuration having no electrode inside is particularly effective for such as an accelerator beampipe, whose use is made difficult by the presence of an electrode. Further, as it requires no power during evacuation, the configuration can be suitably used as a pump for evacuation inside a device such as a semiconductor device or a MEMS.

REFERENCE SIGNS LIST

1 vacuum component (vacuum pump)
10 vacuum container
10A inner surface
11 gas inlet
12 heater (heating means)
20 electrode
20A electrode surface
30 power supply unit
42 Ti layer
42A Ti oxide layer
42B coating layer
100 vacuum chamber
101 turbomolecular pump (TMP)
102 dry pump (DP)
O orifice
S switch

What is claimed is:

1. A vacuum component having a pumping capacity by means of a gettering effect of titanium (Ti):
   including a vacuum container provided with a Ti layer having a thickness of no less than 100 μm, the Ti layer containing Ti;
   evacuating a vacuum chamber to be a target of the evacuation, by being put into a state where either a) the Ti layer does not have a Ti oxide layer formed on the Ti layer and is exposed on an inner surface of the vacuum container, or b) the Ti layer has a Ti oxide layer directly formed on the Ti layer in a manner to have a thickness of no greater than 1 nm, or a surface oxygen concentration of no greater than 20 atomic %, and is exposed on an inner surface of the vacuum containers;
   wherein
   the vacuum component includes:
   an electrode provided inside the vacuum container, the electrode having an electrode surface corresponding to its surface facing the inner surface of the vacuum container; and
   a gas inlet for introducing an inert gas into the vacuum container,
   the vacuum component is configured such that its state can be switched between a first state of generating DC discharge by introducing the inert gas into the vacuum container and setting the electrode surface at a positive potential and the inner surface at a negative potential, and a second state of setting the electrode surface at the same potential as the inner surface or setting the electrode surface in a floating state from the inner surface without introducing the inert gas into the vacuum container, and
   the vacuum component is set to be in the second state when performing evacuation.

2. The vacuum component according to claim 1,
   wherein the inner surface is cylindrically shaped, and
   wherein the electrode is arranged along the central axis of the cylindrical shape.

3. A vacuum component having a pumping capacity by means of a gettering effect of titanium (Ti), including
   a vacuum container provided with a Ti layer having a thickness of no less than 100 μm, the Ti layer containing Ti,
   wherein, either a) the Ti layer does not have a Ti oxide layer formed on the Ti layer, or b) the Ti layer has a Ti oxide layer directly formed on the Ti layer in a manner to have a thickness of no greater than 1 nm, or a surface oxygen concentration of no greater than 20 atomic %,
   wherein a coating layer either containing an NEG (Non-evaporable getter) material selected from Ti, zirconium (Zr), vanadium (V), hafnium (Hf) and niobium (Nb) or containing a noble metal selected from palladium (Pd), gold (Au), silver (Ag) and platinum (Pt) is directly formed on a) the Ti layer not having a Ti oxide layer or b) the Ti layer having a Ti oxide layer formed thereon, and wherein the vacuum component evacuates a vacuum chamber to be a target of the evacuation, by being put into a state where the coating layer is exposed on an inner surface of the vacuum container, wherein the vacuum component includes:

an electrode provided inside the vacuum container, the electrode having an electrode surface corresponding to its surface facing the inner surface of the vacuum container; and a gas inlet for introducing an inert gas into the vacuum container, the vacuum component is configured such that its state can be switched among a first state of generating DC discharge by introducing the inert gas into the vacuum container and setting the electrode surface at a positive potential and the inner surface at a negative potential, a second state of setting the electrode surface at the same potential as the inner surface or setting the electrode surface in a floating state from the inner surface without introducing the inert gas into the vacuum container, and a third state of generating DC discharge by introducing the inert gas into the vacuum container and setting the electrode surface at a negative potential and the inner surface at a positive potential, the electrode surface is formed of a material constituting the coating layer, and the vacuum component is set into the second state when performing evacuation.

4. The vacuum component according to claim 3, wherein the coating layer is configured to have a thickness of no greater than 10 μm.

5. The vacuum component according to claim 3, the electrode is configured to be attachable and detachable to the vacuum container.

6. An evacuation method using the vacuum component according to claim 5:

including a heating process in which, after forming the coating layer by establishing the third state subsequently to the first state, the electrode is detached from the vacuum container, and the vacuum container is sealed and is subsequently heated; and evacuating the vacuum chamber from the vacuum container side, after the heating process.

7. The evacuation method according to claim 6, wherein, in the heating process, the vacuum container is heated at a temperature greater than a starting temperature of the vacuum container and less than or equal to 300° C.

* * * * *